No. 673,258. Patented Apr. 30, 1901.
F. B. HARRINGTON.
APPARATUS FOR CONVEYING GLASS ARTICLES.
(Application filed Jan. 17, 1901.)
(No Model.) 3 Sheets—Sheet 1.
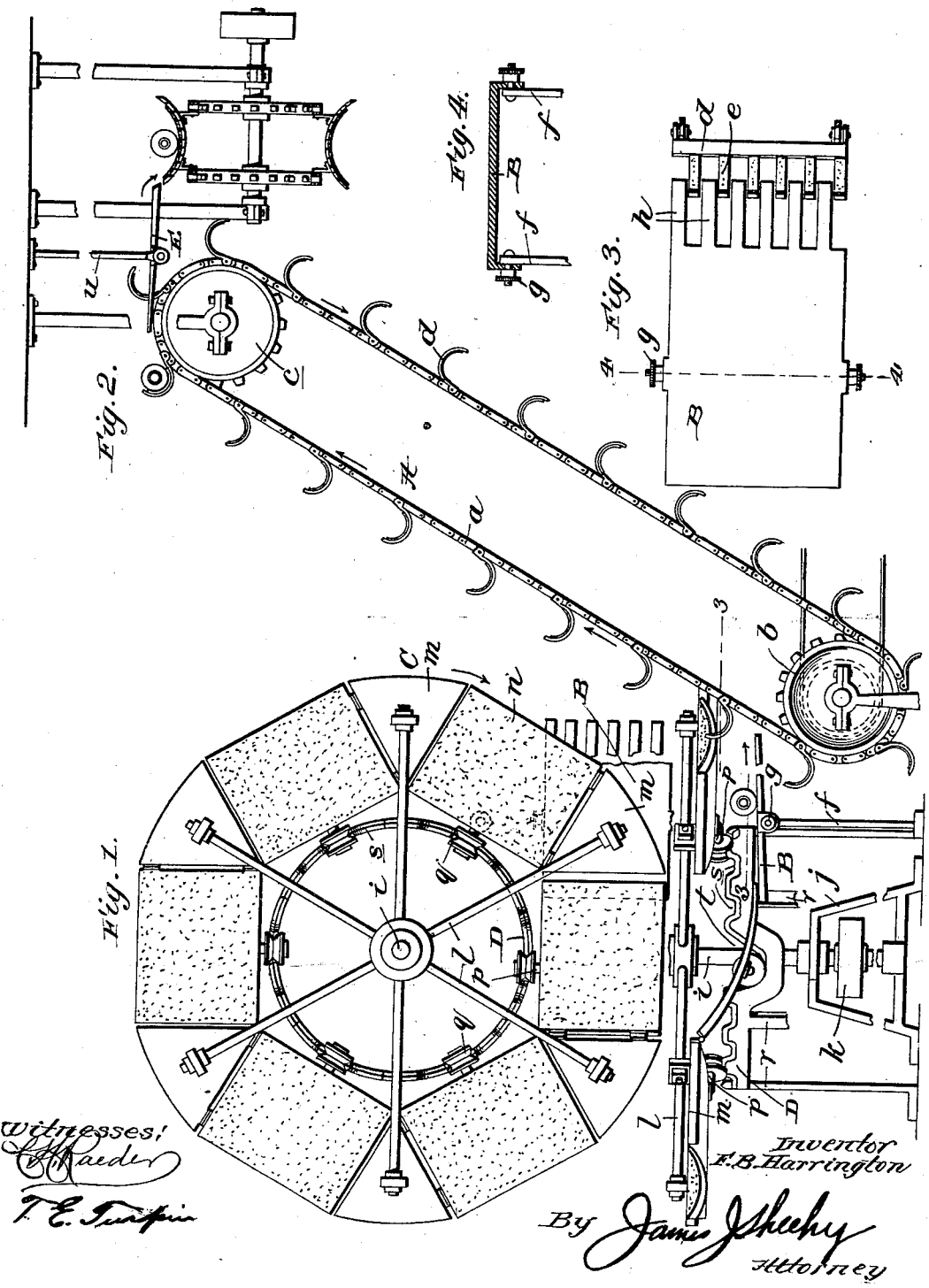

No. 673,258. Patented Apr. 30, 1901.
F. B. HARRINGTON.
APPARATUS FOR CONVEYING GLASS ARTICLES.
(Application filed Jan. 17, 1901.)
(No Model.) 3 Sheets—Sheet 2.
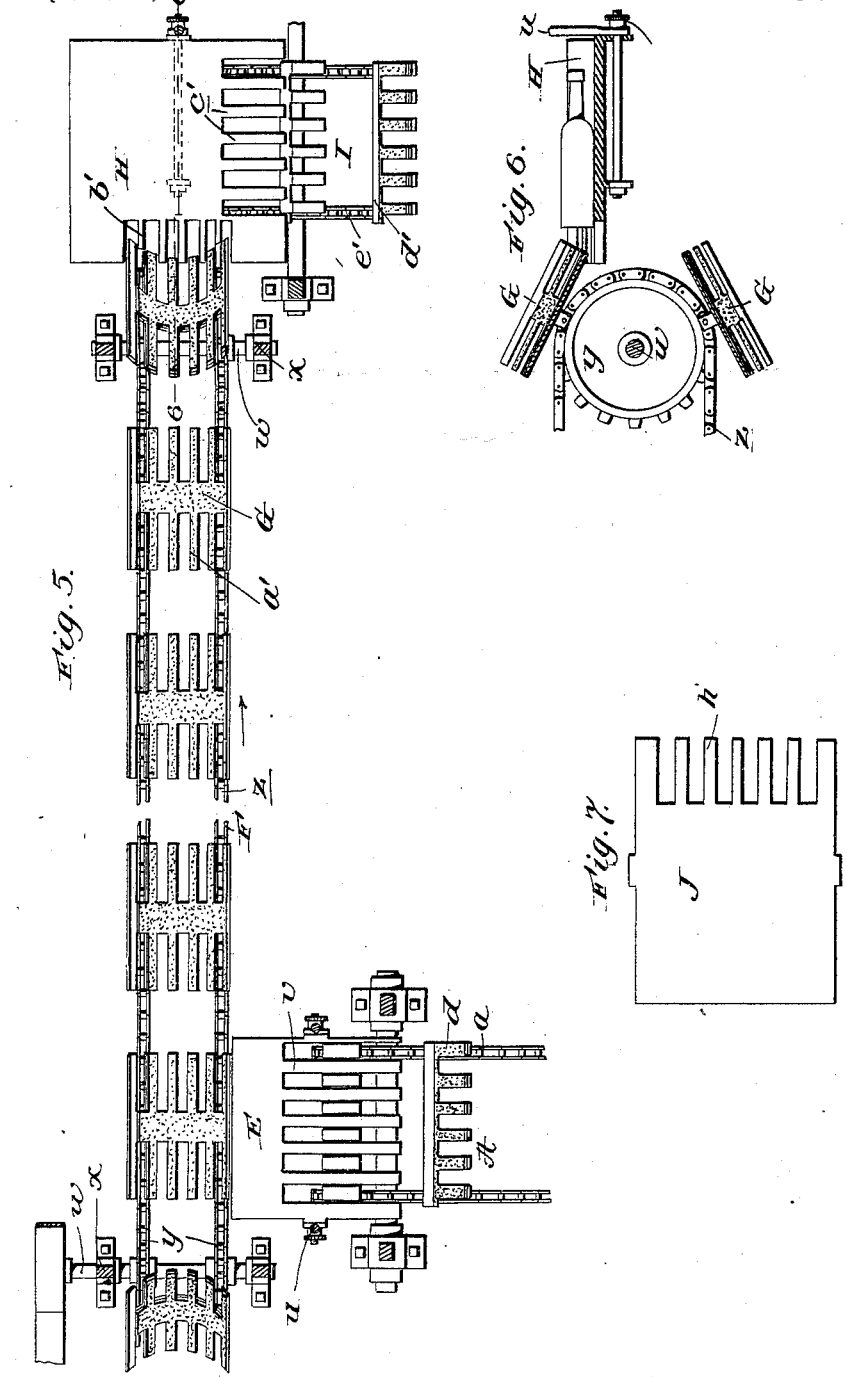

No. 673,258. Patented Apr. 30, 1901.
F. B. HARRINGTON.
APPARATUS FOR CONVEYING GLASS ARTICLES.
(Application filed Jan. 17, 1901.)
(No Model.) 3 Sheets—Sheet 3.
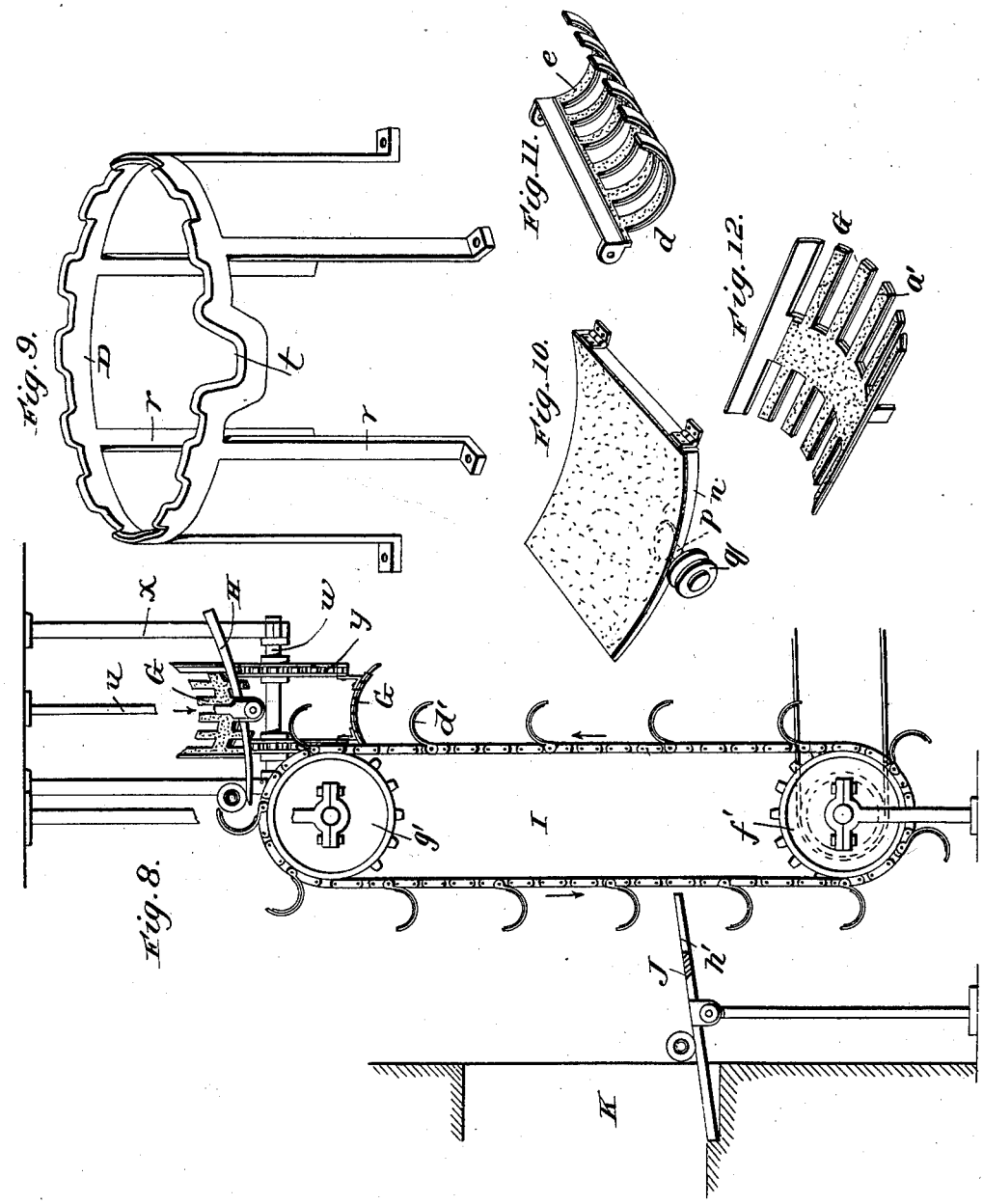
Witnesses:
Inventor
F. B. Harrington
By James J. Huhy
Attorney

UNITED STATES PATENT OFFICE.

FRANK B. HARRINGTON, OF STREATOR, ILLINOIS.

APPARATUS FOR CONVEYING GLASS ARTICLES.

SPECIFICATION forming part of Letters Patent No. 673,258, dated April 30, 1901.

Application filed January 17, 1901. Serial No. 43,666. (No model.)

*To all whom it may concern:*

Be it known that I, FRANK B. HARRINGTON, a citizen of the United States, residing at Streator, in the county of Lasalle and State of Illinois, have invented new and useful Improvements in Apparatus for Conveying Glass Articles, of which the following is a specification.

My invention relates to improvements in that class of conveyers which are designed more particularly for carrying bottles and other articles of glass from place to place in a glass-factory; and it comtemplates the provision of a conveying apparatus which is calculated to carry bottles and similar articles of glass from glass-blowers to the leer or tempering-oven and maintain the bottles or similar articles in a rolling motion incident to the cooling thereof while in transit, the latter with a view of retaining the proper form and preventing flattening of the bottles or other articles, and thereby reducing the percentage of loss.

With the foregoing in mind the invention will be fully understood from the following description and claims when taken in conjunction with the accompanying drawings, in which—

Figure 1 is a top plan view of the rotary receiving-table comprised in my improved apparatus. Fig. 2 is a view illustrating the rotary table and elevator of the apparatus in elevation and the elevated endless carrier thereof in transverse section. Fig. 3 is a detail section taken in the plane indicated by the broken line 3 3 of Fig. 2 and illustrating the manner in which the fingers of the elevator-buckets take between the fingers of the platform which receives from the rotary table, with a view of taking bottles or similar articles from said platform without shock or jar. Fig. 4 is a detail transverse section taken in the plane indicated by the broken line 4 4 of Fig. 3. Fig. 5 is a horizontal section illustrating the elevated endless carrier of my improvements, together with the platform from which it receives and that into which it discharges. Fig. 6 is a detail section taken in the plane indicated by the broken line 6 6 of Fig. 5 and illustrating the manner in which a bottle is discharged from the endless carrier to the platform arranged to receive therefrom. Fig. 7 is a top plan view of the platform which has for its purpose to guide the bottles into the leer or tempering-oven. Fig. 8 is a detail view illustrating the platform which receives from the elevated endless carrier the endless bottle-lowering device which receives from said platform and the platform which receives in turn from the lowering device and is arranged with respect to said lowering device and the leer so as to carry bottles from the former to the latter. Fig. 9 is a perspective view of the circular track disposed below the rotary table. Fig. 10 is a perspective view of one of the oscillatory pans of the rotary table. Fig. 11 is a perspective view of one of the buckets of the endless elevator, the buckets of the endless lowering device shown in Fig. 8 being of a similar construction. Fig. 12 is a perspective view of one of the trays of the elevated endless carrier.

In the said drawings similar letters of reference designate corresponding parts in all of the several views, referring to which—

A is an endless elevator which comprises chains *a*, arranged on lower and upper sprocket-wheels *b c*, and concavo-convex buckets *d*, the latter being arranged at about the proportional distance illustrated apart and being formed of fingers *e*, which are covered on their inner sides with paper, asbestos, or other suitable material, with a view of preventing chilling and breaking of the bottles or other articles of glass.

B is a platform which is adjustably fixed on supports *f* by means of thumb-nuts *g* and is provided with fingers *h*, designed to receive the fingers *e* of the buckets *d* between them after the manner best shown in Fig. 3.

C is a rotary table which is arranged adjacent to where the glass-blowers work and is designed to receive the bottles or other articles of glass after the same have been finished, and D is a circular track disposed below the table for a purpose presently pointed out.

In the present embodiment of my invention the table C comprises an upright shaft *i*, journaled in a pedestal *j* and equipped with a band-pulley *k*, arms *l*, which are connected to and extend radially from the shaft *i* and are fixedly connected at their outer ends to sector-shaped plates *m*, and pans *n*, which have concave upper sides covered with asbestos or equivalent material, with a view of preventing chilling of the bottles, and are connected in a hinged manner at their forward ends to the sector-shaped plates m and provided with short shafts p, bearing traveling wheels q. The pans n are interposed between the sector-shaped plates m and are free to be oscillated vertically. Their traveling wheels q are arranged to bear on the circular track D, which is mounted on suitable supports r and is provided in its upper edge with a plurality of depressions s and a comparatively deep depression t, the latter being arranged, as shown in Fig. 2, with respect to the platform B so as to cause the pans to sink and discharge their burdens on the rear end of the platform when they reach a position immediately in advance of the platform with reference to the direction in which the table is rotated. By virtue of the construction thus far described it will be seen that when the table is rotated the wheels q of the pans n passing over the track D will cause the pans to slowly oscillate vertically. From this it follows that the bottles when placed in a highly-heated state on the pans will be caused to roll to and fro in the direction of the length thereof, and consequently will be effectually prevented from flattening or losing their form. When a pan carrying a bottle reaches a position immediately in advance of the platform B, its wheel q will sink into the comparatively deep depression t of track D, and it will assume an inclined position, as shown, and thereby enable the bottle to roll from it to the said platform. The platform is preferably inclined upwardly to a slight extent, this with a view of retarding the bottle and depositing it gently into one of the buckets d of the elevator A, which bucket, as before described, has fingers adapted to take between those of the platform, and thereby receive the bottle without shock or jar. The platform B may obviously be adjusted so as to rest at different angles of inclination or in a horizontal position. The rolling of the bottles while in the pans of the rotary table expedites cooling of the bottles and, as before stated, prevents the bottles from losing their shape incident to the cooling operation, so that when they are delivered to the buckets of the endless elevator they are cooled to such an extent that there is little liability of their shape being altered during the remainder of their passage to the leer or tempering-oven.

E is a platform adjustably connected to hangers u and having fingers v arranged to receive those of the elevator-buckets d between them, and F is an elevated endless carrier which is arranged at such an elevation as to permit of the free passage of workmen beneath it. The platform E is arranged to receive the bottles or other articles of glass from the elevator A, while the elevated carrier F is arranged to receive the bottles or other articles from the platform. The said endless carrier in the preferred embodiment of the invention comprises shafts w, journaled in suitable hangers x and provided with sprocket-wheels y, parallel chain belts z, which take around the sprocket-wheels y, and trays G, which have faces of concave form in cross-section and are provided at their opposite ends with fingers a'. The concave form of the trays G enables them to hold the bottles and also permits of the bottles rolling to and fro while in transit from the platform E to another platform, H. Like the pans n and the buckets d, the trays G are preferably covered with asbestos or equivalent material, with a view of preventing chilling and breaking of the bottles.

The platform H, which, like the platforms B and E, is by preference adjustably fixed in position, is provided with fingers b', arranged to intermesh with the fingers of the trays G, and other fingers, c', arranged to intermesh with the fingers of the buckets d' of the lowering device I. This latter preferably comprises chain belts e', arranged on lower and upper sprocket-wheels f' g', and the said buckets d', which are similar in construction to those of the elevator A and are designed to receive the bottles or other glass articles from the platform H.

J is a platform arranged to discharge into a leer or tempering-oven K and having fingers h' arranged to receive between them the fingers of the buckets d' of the lowering device.

The rotary table C, the elevator A, the elevated carrier F, and the lowering device I are in practice driven by suitable motive power in the directions indicated by arrows in the several views of the drawings. Consequently it will be seen that when the finished bottles are placed on the pans of the rotary table they will be slowly carried around toward the platform B, and while en route will be caused to roll to and fro, which will expedite the cooling thereof and prevent them from losing their shape incident to the cooling. When a pan carrying a bottle reaches a position which enables its traveling wheel to take into the depression t of track D, the pan will assume an inclined position, and the bottle will in consequence be automatically discharged in a gentle manner to the platform B. The bottle will roll up the platform and be taken therefrom in a gentle manner by the elevator A, by which it will be conveyed to and discharged on the platform E. From said platform the bottle will be discharged to one of the trays G of the carrier F and will be carried by the latter across the shop to the platform H, on which it will be gently placed, after the manner best shown in Fig. 6, the said platform H being of course arranged in such a plane as to afford sufficient fall to enable the bottle to pass from the tray of the carrier thereto. The bottle will pass down the platform H to one of the buckets of the lowering device I and will be carried thereby to the platform J, down which it will roll into the leer or tempering-oven. From the above-described operation it will be apparent that the movements of the table C, elevator A, carrier F, and lowering device I will be properly timed so as to enable the said devices to properly operate in conjunction.

From the foregoing it will be appreciated that while my improved apparatus is simple and inexpensive and takes up but little floor-space in a shop it is calculated to automatically and expeditiously convey bottles or other articles from the blowers to the leer or tempering-oven in such manner that the bottles are effectually prevented from losing their shape; also, that the conveyance of the bottles and the transfer of the same from one of the devices of the apparatus to another is effected in such a gentle manner that the percentage of loss is much less than when the bottles or other articles are carried from the blowers to the leer by boys.

I have entered into a detail description of the construction and relative arrangement of parts embodied in this the preferred embodiment of my invention in order to impart a full, clear, and exact understanding of the same. I do not desire, however, to be understood as confining myself to such specific construction and arrangement of parts, as such changes or modifications may be made in practice as fairly fall within the scope of my invention.

Having described my invention, what I claim, and desire to secure by Letters Patent, is—

1. A conveying apparatus for articles of glass, comprising a horizontally-movable support, one or more vertical oscillatory pans carried thereby, and having concave upper sides, and means for oscillating the pan or pans vertically incident to the horizontal movement of the support, whereby articles of glass carried by said pans are caused to roll to and fro thereon.

2. A conveying apparatus for articles of glass, comprising a horizontal rotary table, vertical oscillatory pans carried thereby and having concave upper sides, and means for oscillating the pans vertically incident to the horizontal movement of the table, whereby articles of glass carried by said pans are caused to roll to and fro thereon.

3. A conveying apparatus for articles of glass comprising a horizontally-movable support, one or more vertically-movable pans carried thereby, and means for moving the pans vertically incident to the horizontal movement of the support, and permitting the same to fall a considerable distance at a predetermined point.

4. A conveying apparatus for articles of glass comprising a horizontal rotary table, vertically-movable pans carried thereby, and means for moving the pans vertically incident to the horizontal movement of the table and permitting the same to fall a considerable distance at a predetermined point.

5. A conveying apparatus for articles of glass comprising a horizontally-movable support, one or more vertical oscillatory pans carried thereby, and having concave upper sides, and means for oscillating the pan or pans vertically incident to the horizontal movement of the support, whereby articles of glass carried by said pans are caused to roll to and fro thereon, and for permitting the pans to fall a considerable distance at a predetermined point.

6. A conveying apparatus for articles of glass comprising a horizontal rotary table, vertical oscillatory pans carried thereby and having concave upper sides, and means for oscillating the pans vertically incident to the horizontal movement of the table, whereby articles of glass carried by said pans are caused to roll to and fro thereon, and for permitting the pans to fall a considerable distance at a predetermined point.

7. In an apparatus for conveying articles of glass, a horizontally-movable table having one or more pans movable vertically, and a track supporting the pan or pans and having depressions at intervals of its length, and also having a comparatively deep depression.

8. An apparatus for conveying articles of glass, comprising a horizontal rotary table, vertically-movable pans carried thereby, a circular track disposed below and supporting the pans, and having depressions at intervals of its length, and a comparatively deep depression at a predetermined point to permit the pans to drop a considerable distance and discharge their burdens, and means arranged to receive from the pans at the discharge-point.

9. In an apparatus for conveying articles of glass, a rotary horizontal table having pans connected thereto in a hinged manner and adapted to oscillate vertically, and a circular track disposed below and supporting the pans, and having depressions at intervals of its length, and also having a comparatively deep depression.

10. In an apparatus for conveying articles of glass, a rotary, horizontal table comprising a main frame, and pans connected in a hinged manner to the frame and so as to enable them to oscillate vertically; said pans being concave at their upper sides and having wheels, and a track of circular form disposed below the table and having depressions at intervals of its length, and also having a comparatively deep depression.

11. An apparatus for conveying articles of glass comprising a horizontally-movable table having a plurality of pans movable vertically, means for moving the pans vertically incident to the horizontal movement of the table, and permitting the same to fall a considerable distance at a predetermined point, a support arranged to receive articles of glass from the pans when the latter are in their lowermost position, and means arranged to receive the articles of glass from said support and carry the same to a predetermined point of destination.

12. In an apparatus for conveying articles of glass, a rotary horizontal table comprising a frame, and vertical oscillatory pans carried thereby, a circular track supporting the pans of the table, and having depressions at intervals of its length and also having a comparatively deep depression, a platform arranged to receive articles of glass from the pans when the latter are in their lowermost position, and means for receiving articles of glass from the platform and carrying the same to a point of destination.

13. A conveying apparatus for articles of glass, comprising a horizontally-movable support, one or more vertically-movable pans carried thereby, means for moving the pans vertically incident to the horizontal movement of the support and permitting the same to fall a considerable distance at a predetermined point, so as to enable them to discharge their burdens, and means arranged to receive from the pans at the discharge-point thereof.

14. A conveying apparatus for articles of glass, comprising a horizontal rotary table, vertical oscillatory pans carried thereby and having concave upper sides, means for moving the pans vertically incident to the horizontal movement of the table, and permitting the same to fall a considerable distance at a predetermined point so as to enable them to discharge their burdens, and means arranged to receive from the pan at the discharge-point thereof.

15. An apparatus for conveying articles of glass, comprising a horizontally-movable table having vertical oscillatory pans, means for moving said pans vertically incident to the horizontal movement of the table, and permitting the pans to fall a considerable distance at a predetermined point, a platform arranged to receive from the pans when the latter are in their lowermost position, an elevator arranged to receive from said platform, an elevated platform arranged to receive from said elevator, an elevated carrier arranged to receive from the elevated platform, an elevated platform arranged to receive from the elevated carrier, a lowering device arranged to receive from the latter platform, and a platform arranged to receive from said lowering device and discharge into a leer or tempering-oven.

16. In an apparatus for conveying articles of glass, the combination of a horizontally-movable table having vertically-oscillating pans, means for moving said pans vertically incident to the horizontal movement of the table, an elevator, means for transferring articles of glass from the pans of the table to the elevator, an elevated carrier, means for transferring articles of glass from the elevator to the elevated carrier, a lowering device, means for transferring articles of glass from the elevated carrier to said lowering device, and means for transferring articles of glass from the lowering device to a leer or tempering-oven.

17. A conveying apparatus for articles of glass comprising a horizontally-movable support, vertically-movable pans carried thereby, means whereby the pans are enabled to drop and discharge their burdens at a predetermined point, and means arranged to receive from the pans at such point.

18. A conveying apparatus for articles of glass comprising a horizontal rotary table, vertically-movable pans carried thereby, means whereby the pans are enabled to drop and discharge their contents at a predetermined point, and means arranged to receive from the pans at such point.

19. An apparatus for conveying articles of glass, comprising a horizontal rotary support, vertically-movable pans carried thereby, means for permitting said pans to drop at a predetermined point and discharge their burdens, an elevated carrier, and means intermediate of the rotary support and the elevated carrier for transferring articles discharged by the pans of the former to the latter.

In testimony whereof I have hereunto set my hand in presence of two subscribing witnesses.

FRANK B. HARRINGTON.

Witnesses:
C. JOHN BAKER,
ED R. GREENING.